(12) United States Patent
Wang et al.

(10) Patent No.: US 10,439,410 B2
(45) Date of Patent: Oct. 8, 2019

(54) BATTERY PROTECTION CIRCUIT AND SYSTEM

(71) Applicant: Wuxi Vimicro Corporation, Wuxi, Jiangsu (CN)

(72) Inventors: Zhao Wang, Wuxi (CN); David Xiao Dong Yang, Wuxi (CN)

(73) Assignee: Zgmicro Wuxi Corporation, Wuxi (CN)

( * ) Notice: Subject to any disclaimer, the term of this patent is extended or adjusted under 35 U.S.C. 154(b) by 0 days.

(21) Appl. No.: 14/483,484

(22) Filed: Sep. 11, 2014

(65) Prior Publication Data

US 2015/0085413 A1    Mar. 26, 2015

(30) Foreign Application Priority Data

Sep. 25, 2013 (CN) .......................... 2013 1 0442635

(51) Int. Cl.
*H02J 7/00* (2006.01)
*H02H 3/24* (2006.01)

(52) U.S. Cl.
CPC .......... *H02J 7/0031* (2013.01); *H02H 3/243* (2013.01); *H02J 7/0052* (2013.01); *H02J 2007/004* (2013.01)

(58) Field of Classification Search
CPC ........................... H02J 7/00–36; H02H 3/243
See application file for complete search history.

(56) References Cited

U.S. PATENT DOCUMENTS

2015/0241937 A1* 8/2015 Horie .................... H02J 7/0063
713/300

\* cited by examiner

*Primary Examiner* — Ronald W Leja
*Assistant Examiner* — Christopher J Clark
(74) *Attorney, Agent, or Firm* — Joe Zheng

(57) ABSTRACT

Techniques pertaining to battery protection circuits are disclosed. According to one embodiment of the present invention, the battery protection circuit includes a power button, a power detection circuit, a first switch coupled between the power button and the power detection circuit, the power detection circuit configured to output a power-off signal when either the first switch or the power button is in a switch-off state, a low-voltage detection circuit coupled with a battery and configured to detect whether a voltage of the battery is lower than a low-voltage detection threshold or not, and switch off the first switch to cut off an electric leakage path of the battery when the voltage of the battery is determined to be lower than the low-voltage detection threshold, and a power management circuit coupled with the power detection circuit and configured to cut off an electric discharge path of the battery to prohibit the battery from discharging when receiving the power-off signal.

19 Claims, 3 Drawing Sheets

BATTERY PROTECTION CIRCUIT AND SYSTEM

BACKGROUND OF THE INVENTION

1. Field of the Invention

The present invention relates to the field of battery protection, and in particular, to a battery protection circuit and system.

2. Description of Related Art

Portable electronic devices, such as digital cameras, cell phones, tablet computers, portable audio/visual devices or Bluetooth devices, employ increasingly lithium batteries as a major power. The lithium battery has many advantages including small size, high energy density, no memory effect, long cycle life, high battery voltage and low self-discharge rate. Due to these characteristics, the lithium battery is likely to explode or to be damaged, thus, attention must be paid to the safety when charging and discharging.

A protection chip is specially designed to protect the battery. The battery protected by a protection chip supplies power to the electronic device. FIG. 1 is a circuit diagram showing a conventional battery protection circuit for an electronic device. The battery protection circuit of FIG. 1 includes a battery BT1, a battery protection chip VM, a power switch MN1, a power switch MN2, a resistor R1, a resistor R2, a capacitor C1 and a protection control circuit P1. The protection control circuit P1 includes a charging circuit, a power management circuit, a power detection circuit T1, a resistor R3 and a resistor R4. When a voltage of the battery BT1 is higher than a charging voltage protection threshold, an output CO of the battery protection chip becomes a low level and the power switch NM2 switches off, thereby cutting off a charging path of the battery BT1 to prohibit further charging. When the voltage of the battery is lower than a discharging voltage protection threshold, an output DO of the battery protection chip turns to the low level, the power switch NM1 is switched off, thereby cutting off a discharging path of the battery BT1 to prohibit further discharging.

The battery protection circuit is necessary for lithium battery. However, a discharging current needs to flow through the power switches MN1 and MN2, thereby increasing power consumption of the battery protection circuit and lowering power supply efficiency.

Therefore, an improved technical solution is necessarily to be provided to overcome the above and other problems.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is directed to a battery protection circuit. According to one embodiment of the present invention, the battery protection circuit includes a power button, a power detection circuit, a first switch coupled between the power button and the power detection circuit, the power detection circuit configured to output a power-off signal when either the first switch or the power button is in a switch-off state, a low-voltage detection circuit coupled with a battery and configured to detect whether a voltage of the battery is lower than a low-voltage detection threshold or not, and switch off the first switch to cut off an electric leakage path of the battery when the voltage of the battery is determined to be lower than the low-voltage detection threshold, and a power management circuit coupled with the power detection circuit and configured to cut off an electric discharge path of the battery to prohibit the battery from discharging when receiving the power-off signal.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
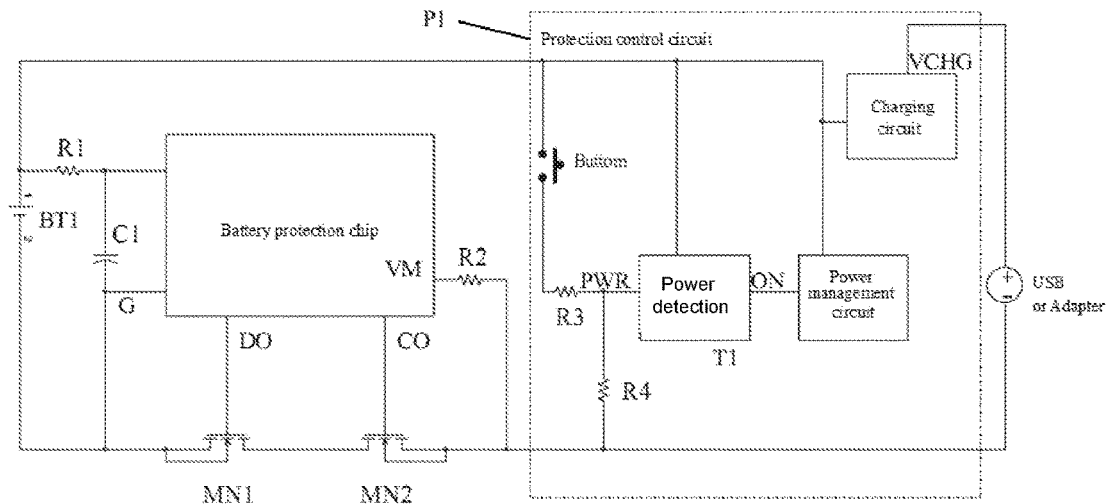
FIG. 1 is a circuit diagram showing a conventional battery protection circuit.
Figure 2:
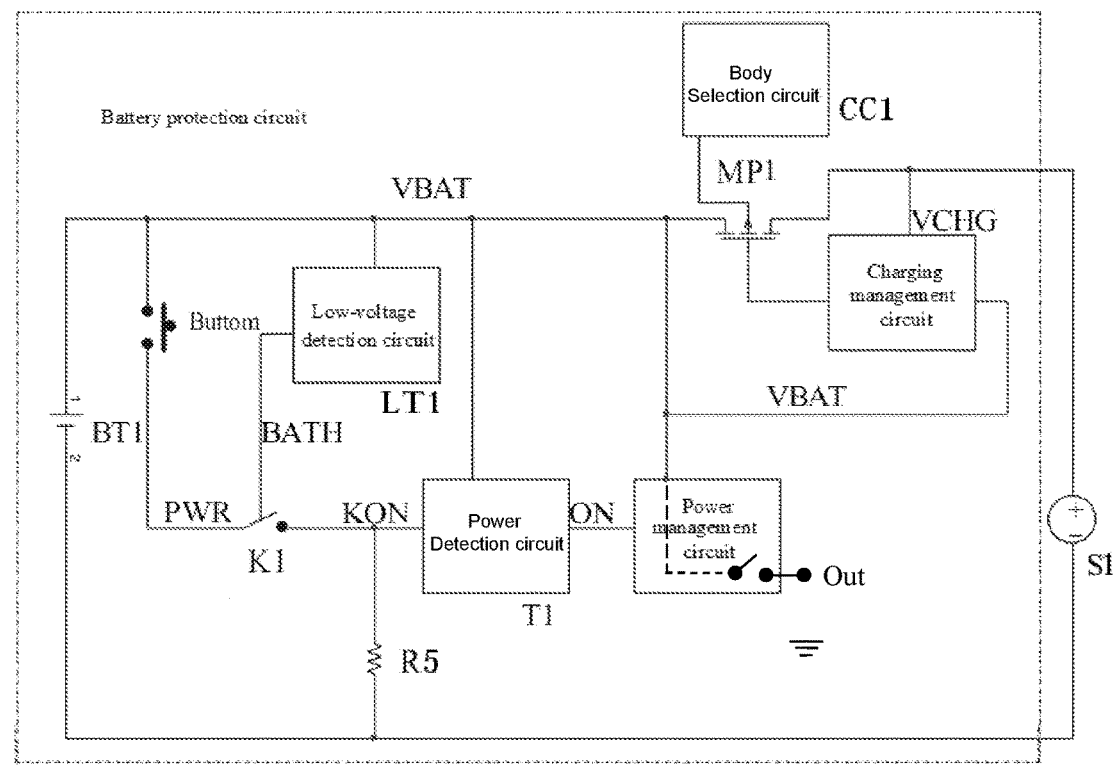
FIG. 2 is a circuit diagram showing a battery protection circuit according to one embodiment the present invention.

A battery protection circuit provided in the present invention may be applied to an electronic device, such as a Bluetooth headset, a smart phone or a tablet computer and other portable electronic devices, using a lithium battery. FIG. 2 is a circuit diagram of a battery protection circuit 200 according to one embodiment of the present invention. The battery protection circuit 200 comprises a power detection circuit T1, a power management circuit, a first switch K1 and a low-voltage detection circuit LT1.

The first switch K1 is coupled between a power button and the power detection circuit T1. A control terminal of the first switch K1 is coupled with the low-voltage detection circuit LT1. The other terminal of the power button is coupled with a positive terminal of a battery BT1.

The low-voltage detection circuit LT1 is coupled with the battery BT1 and configured to detect whether a voltage of the battery BT1 is lower than a low-voltage detection threshold or not, and switch off the first switch K1 to cut off an electric leakage path of the battery BT1 when the voltage of the battery is determined to be lower than the low-voltage detection threshold.

The power detection circuit T1 is configured to output a power-off signal when either the first switch K1 or the power button is in a switch-off state. The power detection circuit T1 has a first input terminal coupled with the battery BT1, a second input terminal coupled with a first terminal of the first switch K1, and an output terminal coupled with the power management circuit Power. When both the first switch K1 and the power button are in a switch-on state, the power detection circuit T1 outputs a power-on signal, and then the power management circuit enters into a power-on state.

The power management circuit is coupled with the power detection circuit T1 and configured to cut off a discharge path of the battery to prohibit the battery from discharging when receiving the power-off signal outputted from the power detection circuit T1. The power management circuit may include at least one of a direct current to direct current converter, a voltage regulator, a power switch and a charge pump, so as to prohibit the battery from discharging when the battery is abnormal, thereby fulfilling battery protection function.

The low-voltage detection threshold is more than or equal to a discharging voltage protection threshold of the battery and lower than a value (e.g. a value between 2.0V and 2.9V) as required by a minimum working voltage, so as to prevent a battery loss caused by over discharge when the voltage of the battery is over low. The low-voltage detection circuit LT1 keeps working all the time.

When the voltage of the battery BT1 is lower than the low-voltage detection threshold, a signal BATH outputted by the low-voltage detection circuit LT1 turns to a low level, and the first switch K1 is controlled to be switched off so as to cut off an electric leakage path via a resistor R5. In the meantime, the input terminal of the power detection circuit T1 is pulled down by switching off the first switch K1, so as to make the signal KON lower than a power-on detection threshold. Accordingly, a signal ON outputted by the power detection circuit T1 also becomes the low level, thereby switching off the power management circuit completely and preventing the battery BT1 from over discharge. In this way, when the voltage of the battery BT1 is lower than the low-voltage detection threshold, even though the power button is pressed under false trigger (e.g. during transportation), the problem that the chip works due to false trigger to excessively consume the power of the battery BT1 may not occur. Simultaneously, the electric leakage path to discharge via the resistor R5 is also cut off even if the battery BT1 is triggered falsely. Thus, the electric leakage may be reduced greatly when the voltage of the battery is too low.

Figure 3:
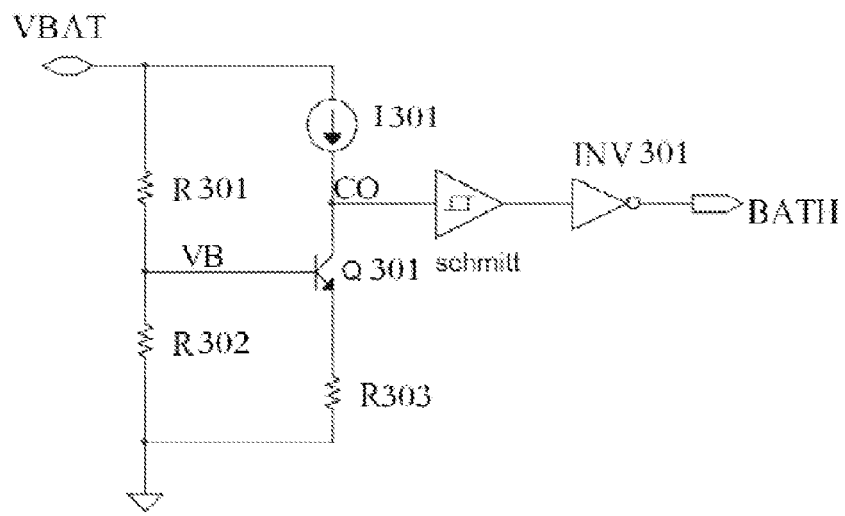
FIG. 3 is a circuit diagram showing a low-voltage detection circuit according to one embodiment the present invention.

FIG. 3 is a schematic circuit diagram showing an exemplary low-voltage detection circuit according to one embodiment of the present embodiment. The low-voltage detection circuit of FIG. 3 includes a first resistor R301, a second resistor R302, a current source I301, a switching transistor Q301, a Schmitt trigger and an inverter INV301. The first resistor R301 and the second resistor R302 are connected between the positive terminal and a negative terminal of the battery in series. The switching transistor Q301 has a control terminal coupled to an intermediate node between the first resistor and the second resistor, and a collector terminal coupled with an output terminal of the current source I301 and an input terminal of the Schmitt trigger. An input terminal of the current source I301 is coupled with the positive terminal of the battery BT1. An output terminal of the Schmitt trigger is coupled to an input terminal of the inverter INV301, and the inverter INV301 outputs a detection result. The low-voltage detection threshold is determined by the ratio of a resistance value of the first resistor R301 to a resistance value of the second resistor R302.

The voltage of the battery BT1 is divided by the first resistor R301 and the second resistor R302 to obtain a dividing voltage VB. When the voltage VB of the intermediate node is high enough to lead a current of the switching transistor Q301 to be higher than the current of the current source I301, the collector terminal CO of the switching transistor Q301 turns to the low level, and the signal BATH outputted from the inverter INV301 turns to the high level. Otherwise, when the voltage VB is lower than a turnover voltage, the signal BATH becomes the low level. The current source I301 has positive temperature coefficient and is realized based on $\Delta Vbe$, i.e. $I301=K1 \cdot \Delta Vbe/R$. The current of the current source I301 flows through the resistor R303 and also generates a voltage on the resistor R303 having positive temperature coefficient, whereas, Vbe of the switching transistor Q301 which may be an NPN transistor has negative temperature coefficient. An appropriate resistance value of the resistor R303 may be selected to achieve a better temperature compensation effect. As a result, the turnover voltage is configured to have a zero temperature coefficient. The turnover voltage at the intermediate node VB is equal to $Vbe+R303 \cdot I301$, wherein Vbe is a base-emitter voltage of the switching transistor Q301, R303 is a resistance value of the resistor R303, and I301 is a current value of the current source I301. A turnover threshold of the output terminal BATH is equal to: $(Vbe+R303 \cdot I301) \cdot (R301+R5)/R301$, where R301 is a resistance value of the resistor R301, and R303 is a resistance value of the resistor R303.

Figure 4:
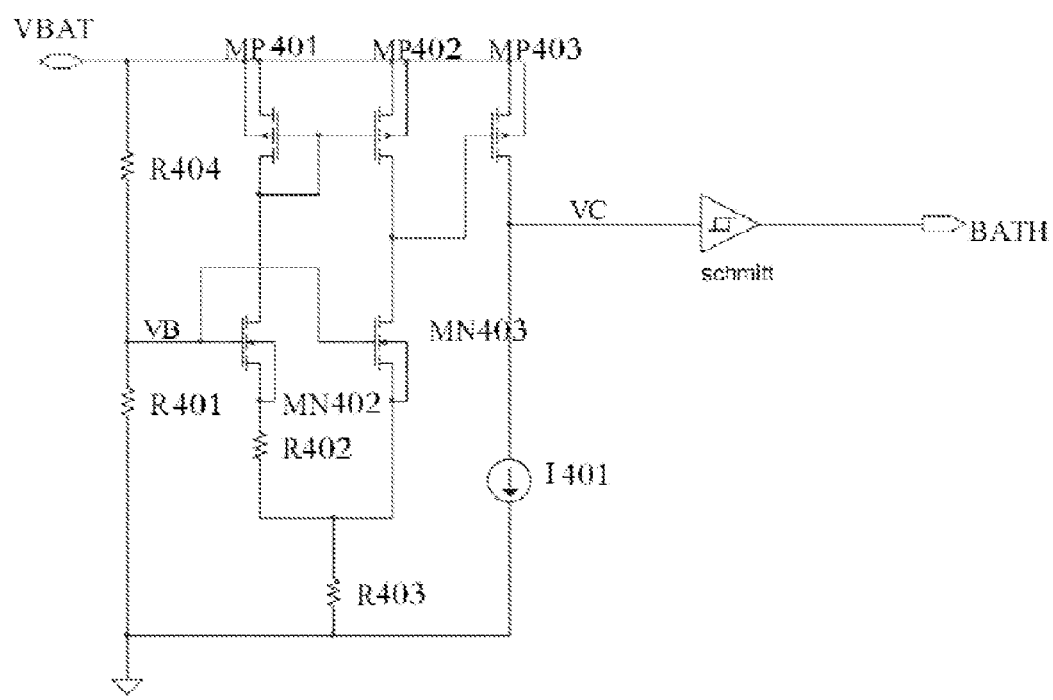
FIG. 4 is a circuit diagram showing the low-voltage detection circuit according to another embodiment of the present invention.

FIG. 4 is a circuit diagram showing the low-voltage detection circuit according to another embodiment of the present invention. The low-voltage detection circuit, as shown in FIG. 4, includes a first resistor R401, a second resistor R404, switching transistors MP401-403, a switching transistor MN402, a switching transistor MN403, a resistor R402, a resistor R403, a current source I401 and a Schmitt trigger. The low-voltage detection circuit is implemented based on a plurality of switching transistors.

The first resistor R401 and the second resistor R403 are coupled in series between a positive terminal and a negative terminal of the battery BT1. An intermediate node VB between the first resistor R401 and the second resistor R403 is coupled to control terminals of the fourth switching transistor MN402 and the fifth switching transistor MN403. The first switching transistor MP401 and the second switching transistor MP402 form a matched current mirror with gates thereof coupled with each other. The fourth switching transistor MN402 and the fifth switching transistor MN403 form a common-source amplification circuit. The third switching transistor MP403 has a drain coupled to one terminal of the current source I401, and a gate coupled to a source of the fifth switching transistor MN403. The drain of the third switching transistor MP403 is coupled to an input terminal of the Schmitt trigger, and an output terminal of the Schmitt trigger outputs a voltage detection result.

The first resistor R401 and the second resistor R404 form a voltage division circuit which performs voltage division on the voltage VBAT. When the VB voltage is higher than a turnover threshold, a voltage VC of the input terminal of the Schmitt inverter turns to the high level, and an output signal BATH passing through the trigger Schmitt also turns to the high level. When the voltage VB is lower than the turnover threshold, the voltage VC turns to the low level, and the output signal BATH passing through the Schmitt trigger also turns to the low level. The switching transistor MP401 and the switching transistor MP402 are designed to form a matched current mirror, and the switching transistor MP403 and the current source I401 form the common-source amplification circuit. A ratio of a width/length ratio of the switching transistor MN402 to a width/length ratio of the switching transistor MN403 is equal to a certain value which is assumed to be N, such as 8:1. The width/length ratio of the switching transistor MN402 is larger. A proper proportion of the resistor R403 and the resistor R402 may be designed to obtain the VB turnover threshold voltage having a zero temperature coefficient. In order to obtain a more accurate turnover threshold, the switching transistor MN402 and the switching transistor MN403 are generally designed to work in a sub-threshold region. The turnover threshold of the node VB is $Vth+(2R403/R402)\cdot\zeta VT\cdot \ln(N)$, where Vth is a threshold voltage of the switching transistor MN403 and is negative temperature coefficient, $\zeta$ is a sub-threshold current factor, VT is a thermal voltage, in direct proportion to the temperature and equal to kT/q, N is a ratio of the width/length ratio of the switching transistor MN402 to the width/length ratio of the switching transistor MN403, and ln is a logarithmic function.

Proceeding with reference to FIG. 2, the battery protection circuit further includes a charging management circuit and a charging switching transistor MP1. The charging switching transistor has a first terminal coupled to the positive terminal of the battery, a second terminal coupled to a power terminal VCHG for coupling to a charging power supply S1, and a control terminal coupled to an output terminal of the charging management circuit. The charging power supply S1 may be a power supply of a data line USB or an adapter power supply.

The charging management circuit is coupled with the positive terminal of the battery and the power terminal respectively, and is configured to control the charging switching transistor to switch on to charge the battery when the charging power supply S1 is coupled to the power terminal VCHG and a voltage of the charging power supply is higher than the voltage of the battery BT1. The charging switching transistor MP1 is an insulated gate type of field-effect transistor.

Alternatively, the battery protection circuit further includes a body selection circuit CC1. The body selection circuit CC1 is coupled with a body of the charging switching transistor MP1, and configured for selectively coupling the body of the charging switching transistor to one of the first terminal of the charging switching transistor MP1 and the second terminal of the charging transistor MP1 with higher voltage. MOS (Metal Oxide Semiconductor) transistor typically includes four terminals, i.e. a source, a drain, a gate and a body. In order to ensure that the PMOS transistor works normally, the body of the PMOS transistor shall be coupled to either drain or source which has higher voltage. When the voltage of the drain is higher than the voltage of the source, the body shall be coupled with the drain, and when the voltage of the source electrode is higher than the voltage of the drain electrode, the body shall be coupled with the source.

Figure 5:
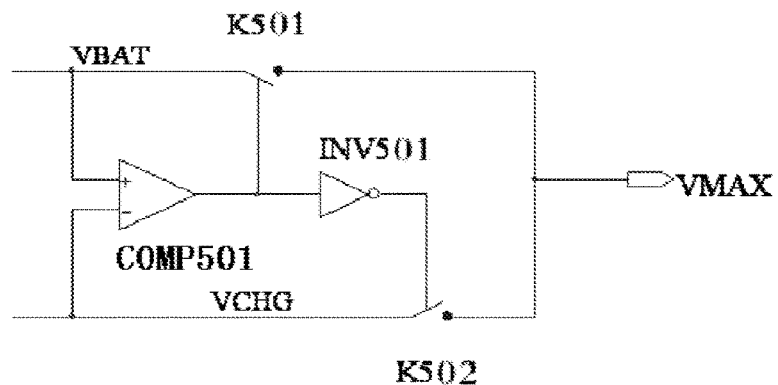
FIG. 5 is a circuit diagram showing a body selection circuit according to one embodiment of the present invention.

FIG. 5 is a circuit schematic diagram showing the body selection circuit according to one embodiment of the present embodiment. The body selection circuit, as shown in FIG. 5, includes a comparer COMP501, an inverter INV501, a switch K501 and a switch K502. The comparer COMP501 has a first input terminal coupled with the positive terminal VBAT of the battery BT1, a second input terminal coupled with the power terminal VCHG, an output terminal coupled with a control terminal of the switch K501 and an input terminal of the inverter INV501. An output terminal of the inverter INV501 is coupled with a control terminal of the switch K502, the switch K501 is coupled between the positive terminal VBAT of the battery BT1 and an output terminal VMAX of the body selection circuit, and the switch K502 is coupled between the power terminal VCHG and the output terminal VMAX of the body selection circuit. The body selection circuit CC1 is configured to select one with the higher voltage from the VBAT and the VCHG to be outputted. The output terminal VMAX of the body selection circuit is coupled to the body terminal of the charging switching transistor MP1.

In this way, the battery BT1 is charged via the charging management circuit according to one embodiment of the present invention. When the plugging of a USB or an adapter is detected, the battery is charged. The charging management circuit generally includes a pre-charging control circuit, a constant-current charging control circuit and a constant-voltage charging control circuit. A charging control process generally includes pre-charging, constant-current charging and constant-voltage charging. When the voltage of the battery is lower than a pre-charging threshold (e.g. 3V), the charging circuit charges the battery with a smaller pre-charging current, which is generally one tenth of a preset constant charging current. When the voltage of the battery rises above the pre-charging threshold (e.g. 3V), the charging circuit outputs the preset constant charging current to charge the battery. When the battery is charged to the constant-voltage charging threshold (e.g. 4.2V), the battery is subjected to constant-voltage charging, and the charging current decreases gradually till the battery is fully charged. In the present invention, the constant-voltage charging threshold of the charging circuit is set to be lower than a charging over-voltage protection threshold of the battery. Those skilled in the art are familiar with the detailed control methods of pre-charging, constant-current charging and constant-voltage charging, thus no more repetition herein.

As described above, the discharge path of the battery is cut off by the low-voltage detection circuit to fulfill battery protection function without employing the battery protection chip, thereby saving cost. Further, since only one power switch is needed during discharging, the power supply efficiency of the battery is improved, and the standby time of an electronic device is prolonged.

Figure 6:
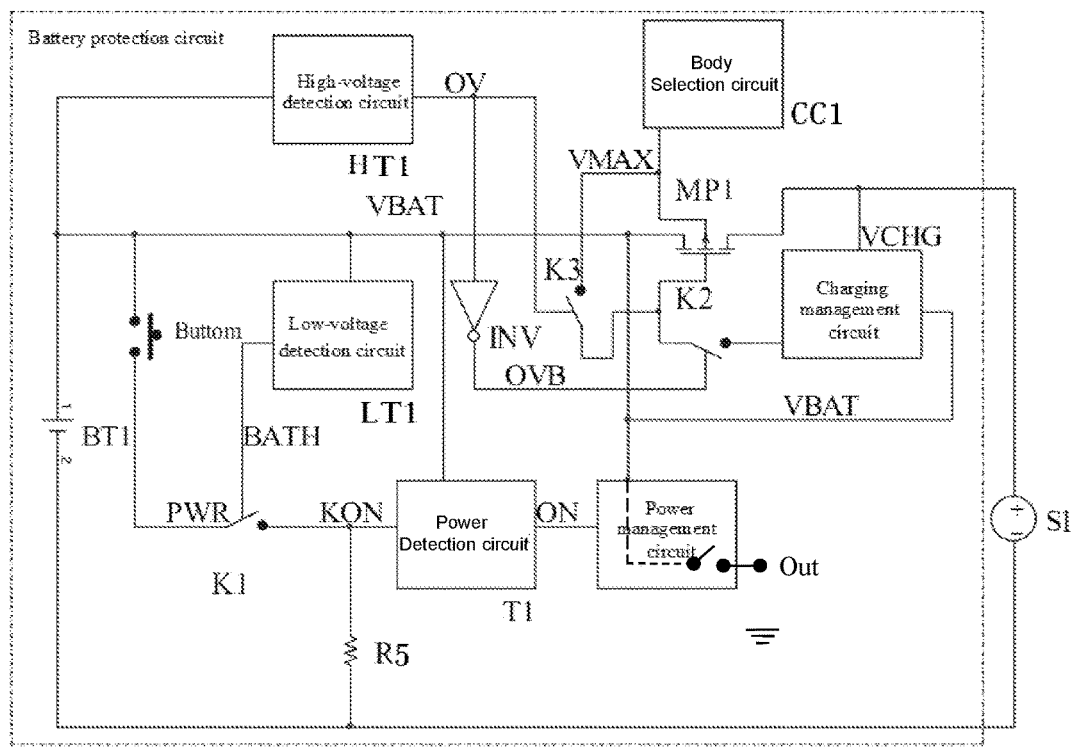
FIG. 6 is a circuit diagram showing the battery protection circuit according to another embodiment of the present invention.

FIG. 6 is a circuit diagram showing the battery protection circuit according to one embodiment of the present invention. The battery protection circuit as shown in FIG. 6 is similar to that as shown in FIG. 2 except that the former further includes a high-voltage detection circuit HT1 and a high-voltage control circuit.

The high-voltage detection circuit HT1 is coupled with the positive terminal of the battery BT1 and configured to detect whether the voltage VBAT of the battery BT1 is higher than a high-voltage detection threshold, output a charging-off signal when the voltage VBAT of the battery BT1 is determined to be higher than the high-voltage detection threshold. The high-voltage control circuit is configured to switch off the charging switching transistor to stop charging the battery when the high-voltage detection circuit output the charging-off signal.

The high-voltage control circuit includes an inverter INV, a second switch K2 and a third switch K3. An input terminal of the inverter INV is coupled with an output terminal of the high-voltage detection circuit HT1. The second switch K2 is coupled between an output terminal of the charging management circuit and a control terminal of the charging switching transistor MP1, and a control terminal of the second switch K2 is coupled with an output terminal of the inverter INV. The third switch K3 is coupled between the control terminal of the charging switching transistor MP1 and a body of the charging switching transistor MP1, and a control terminal of the third switch K3 is coupled with the output terminal of the high-voltage detection circuit HT1.

When the high-voltage detection circuit HT1 outputs the charging-off signal, the second switch K2 is switched off, and the third switch K3 is switched on. For the battery, the over charging is very dangerous, and even results in the explosion of the battery. In order to further enhance the safety of the battery, the high-voltage detection is added additionally to provide another safety guarantee. Even though the charging circuit is damaged due to some abnormal reasons, the high-voltage detection circuit may still independently work normally.

When the battery BT1 is detected to be overvoltage (e.g. 4.275V), an output signal OV of the high-voltage detection circuit HT1 turns to the high level, an signal OVB turns to the low level, the second switch K2 is controlled to be switched off and the third switch K3 is controlled to be switched on. The switch-on of the third switch K3 may raise the voltage of the gate of the charging switching transistor MP1 to the output VMAX of the body selection circuit CC1. Thus, the charging switching transistor MP1 may be switched off completely. The charging path may be cut off to prevent the battery BT1 from over charging, thereby improving the safety of the battery.

The high-voltage detection circuit HT1 may be implemented according to the circuit as shown in FIG. 3 and FIG. 4, and may be implemented simply by changing the resistance value ratio of different resistors, which is omitted here for simplicity. Accordingly, the present invention may also realize the protection function of the battery protection circuit without some devices such as the battery protection chip, the power switch MN1 and the power switch MN2. Further, since the power switches MN1 and MN2 are not needed to be flowed by during discharging, the power supply efficiency of the present invention is higher, which is helpful to prolong the standby time of the electronic device. In addition, the present invention may further provide a battery protection system, which includes a lithium battery and the battery protection circuit as described above.

The battery protection circuit and system provided by the present invention may realize the battery protection function by cutting off the battery discharging path and the charging path via the low-voltage detection circuit and the high-voltage detection circuit without employing the battery protection chip. Thus, the cost is saved. Since a plurality of power switches are not needed, the power supply efficiency of the battery is improved, and the standby time of the electronic device is prolonged The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A battery protection circuit, comprising:
   a power button;
   a power detection circuit;
   a first switch coupled between the power button and the power detection circuit, the power detection circuit configured to output a power-off signal when either the first switch or the power button is in a switch-off state;
   a low-voltage detection circuit coupled with a battery and configured to detect whether a voltage of the battery is lower than a low-voltage detection threshold or not, and switch off the first switch to cut off an electric leakage path of the battery when the voltage of the battery is determined to be lower than the low-voltage detection threshold; and
   a power management circuit coupled with the power detection circuit and configured to cut off an electric discharge path of the battery to prohibit the battery from discharging when receiving the power-off signal.

2. The battery protection circuit according to claim 1, wherein the low-voltage detection circuit comprises a first resistor, a second resistor, a current source, a switching transistor, a trigger and an inverter.

3. The battery protection circuit according to claim 2, wherein the first resistor and the second resistor re coupled in series between a positive terminal and a negative terminal of the battery, the switching transistor has a control terminal coupled to an intermediate node between the first resistor and the second resistor, a collector terminal coupled with an output terminal of the current source and an input terminal of the trigger, an input terminal of the current source is coupled with the positive terminal of the battery, an output terminal of the trigger is coupled to an input terminal of the inverter, and the inverter outputs a voltage detection result, and the low-voltage detection threshold is determined by a ratio of a resistance value of the first resistor to a resistance value of the second resistor.

4. The battery protection circuit according to claim 1, wherein the low-voltage detection circuit comprises a first resistor, a second resistor, a current source, a first switching transistor, a second switching transistor, a third switching transistor, a fourth switching transistor, a fifth switching transistor, a third resistor, a fourth resistor and a trigger, wherein
   the first resistor and the second resistor are coupled in series between a positive terminal and a negative terminal of the battery;
   an intermediate node between the first resistor and the second resistor is coupled to control terminals of the fourth switching transistor and the fifth switching transistor,
   the first switching transistor and the second switching transistor, form a matched current mirror with gates thereof coupled with each other;
   the fourth switching transistor and the fifth switching transistor form a common-source amplification circuit, the third switching transistor has a drain coupled to one terminal of the current source, and a gate coupled to a drain of the fifth switching transistor, and the drain of the third switching transistor is coupled to an input terminal of the trigger, and an output terminal of the trigger outputs a voltage detection result.

5. The battery protection circuit according to claim 1, further comprising:
   a charging switching transistor having a first terminal coupled to a positive terminal of the battery, a second terminal coupled to a power terminal for coupling to a charging power supply, and a control terminal; and
   a charging management circuit coupled with the positive terminal of the battery and the power terminal respectively, and configured to control the charging switching transistor to switch on to charge the battery when the charging power supply is coupled to the power terminal and a voltage of the charging power supply is higher than the voltage of the battery.

6. The battery protection circuit according to claim 5, wherein the charging switching transistor is an insulated gate type of field-effect transistor.

7. The battery protection circuit according to claim 5, further comprising:
   a body selection circuit coupled with a body of the charging switching transistor and configured for selectively coupling the body of the charging switching transistor to one of the first terminal of the charging switching transistor and the second terminal of the charging transistor based on which one of the terminals has a voltage higher than the other terminal.

8. The battery protection circuit according to claim 5, further comprising:
   a high-voltage detection circuit coupled with the positive terminal of the battery and configured to detect whether the voltage of the battery is higher than a high-voltage detection threshold, and output a charging-off signal when the voltage of the battery is determined to be higher than the high-voltage detection threshold; and
   a high-voltage control circuit configured to switch off the charging switching transistor to stop charging the battery when the high-voltage detection circuit outputs the charging-off signal.

9. The battery protection circuit according to claim 8, wherein the high-voltage control circuit comprises an inverter, a second switch and a third switch, and wherein
   an input terminal of the inverter is coupled with an output terminal of the high-voltage detection circuit, the second switch is coupled between an output terminal of the charging management circuit and the control terminal of the charging switching transistor, and a control terminal of the second switch is coupled with an output terminal of the inverter, and
   the third switch is coupled between the control terminal of the charging switching transistor and a body of the charging switching transistor, and a control terminal of the third switch is coupled with the output terminal of the high-voltage detection circuit.

10. The battery protection circuit according to claim 1, wherein the battery management circuit comprises at least one of a direct current to direct current converter, a voltage regulator, a power switch and a charge pump.

11. A battery protection system, comprising:
    a battery;
    a battery protection circuit comprising:
      a power button;
      a power detection circuit;
      a first switch coupled between a power button and the power detection circuit, the power detection circuit configured to output a power-off signal when either the first switch or the power button is in a switch-off state;
      a low-voltage detection circuit coupled with the battery and configured to detect whether a voltage of the battery is lower than a low-voltage detection threshold or not, and switch off the first switch to cut off an electric leakage path of the battery when the voltage of the battery is determined to be lower than the low-voltage detection threshold; and
      a power management circuit coupled with the power detection circuit and configured to cut off an electric discharge path of the battery to prohibit the battery from discharging when receiving the power-off signal.

12. The battery protection system according to claim 11, wherein the low-voltage detection circuit comprises a first resistor, a second resistor, a current source, a switching transistor, a trigger and an inverter; and wherein
    the first resistor and the second resistor are coupled in series between a positive terminal and a negative terminal of the battery;
    the switching transistor has a control terminal coupled to an intermediate node between the first resistor and the second resistor, and a collector terminal coupled with an output terminal of the current source and an input terminal of the trigger;
    an input terminal of the current source is coupled with the positive terminal of the battery, an output terminal of the trigger is coupled to an input terminal of the inverter, and the inverter outputs a voltage detection result, and
    the low-voltage detection threshold is determined by a ratio of a resistance value of the first resistor to a resistance value of the second resistor.

13. The battery protection system according to claim 12, wherein the low-voltage detection circuit comprises a first resistor, a second resistor, a current source, a first switching transistor, a second switching transistor, a third switching transistor, a fourth switching transistor, a fifth switching transistor, a third resistor, a fourth resistor and a trigger, and wherein
    the first resistor and the second resistor are coupled in series between a positive terminal and a negative terminal of the battery;
    an intermediate node between the first resistor and the second resistor is coupled to control terminals of the fourth switching transistor and the fifth switching transistor,
    the first switching transistor and the second switching transistor, form a matched current mirror with gates thereof coupled with each other;
    the fourth switching transistor and the fifth switching transistor form a common-source amplification circuit,
    the third switching transistor has a drain coupled to one terminal of the current source, and a gate coupled to a drain of the fifth switching transistor, and
    the drain of the third switching transistor is coupled to an input terminal of the trigger, and an output terminal of the trigger outputs a voltage detection result.

14. The battery protection system according to claim 11, wherein the battery protection circuit further comprising:
    a charging switching transistor having a first terminal coupled to a positive terminal of the battery, a second terminal coupled to a power terminal for coupling to a charging power supply, and a control terminal; and a charging management circuit coupled with the positive terminal of the battery and the power terminal respectively, and configured to control the charging switching transistor to switch on to charge the battery when the charging power supply is coupled to the power terminal and a voltage of the charging power supply is higher than the voltage of the battery.

15. The battery protection system according to claim 14, wherein the charging switching transistor is an insulated gate type of field-effect transistor.

16. The battery protection circuit according to claim 14, wherein the battery protection circuit further comprising:

a body selection circuit coupled with a body of the charging switching transistor and configured for selectively coupling the body of the charging switching transistor to one of the first terminal of the charging switching transistor and the second terminal of the charging transistor based on which one of the terminals has a voltage higher than the other terminal.

17. The battery protection system according to claim 14, wherein the battery protection circuit further comprising:

a high-voltage detection circuit coupled with the positive terminal of the battery and configured to detect whether the voltage of the battery is higher than a high-voltage detection threshold, and output a charging-off signal when the voltage of the battery is determined to be higher than the high-voltage detection threshold; and a high-voltage control circuit configured to switch off the charging switching transistor to stop charging the battery when the high-voltage detection circuit outputs the charging-off signal.

18. The battery protection system according to claim 17, wherein the high-voltage control circuit comprises an inverter, a second switch and a third switch, and wherein an input terminal of the inverter is coupled with an output terminal of the high-voltage detection circuit, the second switch is coupled between an output terminal of the charging management circuit and the control terminal of the charging switching transistor, and a control terminal of the second switch is coupled with an output terminal of the inverter, and the third switch is coupled between the control terminal of the charging switching transistor and a body of the charging switching transistor, and a control terminal of the third switch is coupled with the output terminal of the high-voltage detection circuit.

19. The battery proctection system according to claim 11, wherein the power management circuit comprises at least one of a direct current to direct current converter, a voltage regulator, a power switch and a charge pump.

* * * * *